April 24, 1956 N. MIRONOFF 2,742,782
UNIVERSAL APPARATUS FOR TESTING THE MECHANICAL PROPERTIES
OF METALS BY ALTERNATIVE BENDING A TEST PIECE
Filed June 3, 1954 7 Sheets-Sheet 1

INVENTOR
Nicolas Mironoff.

BY

ATTORNEY

INVENTOR
Nicolas Mironoff.

BY

Emery L. Groff

ATTORNEY

April 24, 1956

N. MIRONOFF

2,742,782

UNIVERSAL APPARATUS FOR TESTING THE MECHANICAL PROPERTIES
OF METALS BY ALTERNATIVE BENDING A TEST PIECE

Filed June 3, 1954

INVENTOR
Nicolas Mironoff.

BY Emory L. Groff

ATTORNEY

INVENTOR
Nicolas Mironoff.

BY Emery L. Groff

ATTORNEY

INVENTOR
Nicolas Mironoff.

BY

ATTORNEY

INVENTOR
Nicolas Mironoff

BY

ATTORNEY

United States Patent Office 2,742,782
Patented Apr. 24, 1956

2,742,782

UNIVERSAL APPARATUS FOR TESTING THE MECHANICAL PROPERTIES OF METALS BY ALTERNATIVE BENDING A TEST PIECE

Nicolas Mironoff, Geneva, Switzerland, assignor to Ateliers des Charmilles S. A., Geneva, Switzerland, a corporation of Switzerland Application June 3, 1954, Serial No. 434,216

Claims priority, application Switzerland June 8, 1953

2 Claims. (Cl. 73—100)

The present invention relates to apparatus for testing metals by the alternative bending of a test piece.

Various apparatus employing this method are already known and amongst these apparatus comprising two converging pairs of jaws, one adapted to clamp the test piece and the other for guiding the same.

These known bending apparatus are generally of a very rudimentary construction. The stresses in the metal body under test, viz. the amount of resistance within said body equal to and opposite to the force or load applied to said body, and the accompanying strains, viz. deformation per unit dimension of said body, and the hardening characteristics of said metal result in additional deformations (strains) during the testing procedure as a result of the constant changing of the test zone of the metal body under test, thereby leading to arbitrary variations in the results of the tests.

An important step towards improving the test by alternating folding has been effected by the use of a pair of movable guide jaws and by a particular construction of the clamping jaws, thus eliminating, to a predetermined extent, the additional or parasite deformations of the test piece and more effectively localising the testing zone, as disclosed in the Belgian Patent No. 503,734.

The apparatus of the Belgian Patent No. 503,734, although an improvement on devices prior thereto, still has not been capable of giving readings whereby the principal mechanical qualities of metals are obtainable by using the method of alternating bending of a test piece.

To assist in understanding the theory of the invention:

In fact, all existing bending apparatus were only adapted for ascertaining the plasticity of the metal, which was measured by the number of bendings before the test piece was broken. However, a deeper study of the question has shown that this method of alternative folding has great possibilities of development and may be applied for studying other important mechanical properties, particularly: viz. the limit of elasticity and the modulus of elasticity; the modulus of plasticity; the tenacity (or solidity) and the resistance to destruction (or rupture); the specific work of destruction of the metal; its hardening characteristics.

But, in order to obtain all these particulars of test by alternate bendings, it is necessary to carry out these tests whilst taking into consideration three essential conditions:

1. A rigorous constancy in the testing zone and absolute regularity of the deformation;

2. The possibility of measuring the resistance which the metal opposes to this deformation (in all the stages of deformation: both resilient and plastic);

3. The possibility of adjusting all the conditions of the test by making them suitable to the nature of the metal which is being tested (adjusting the length of the deformed zone, sensitiveness of the measurement of the resistance to deformations and so forth).

Figure 1:
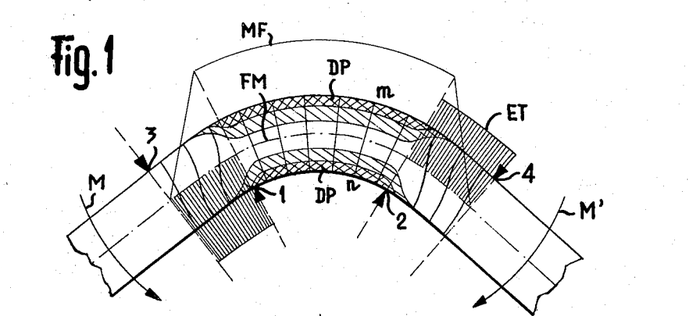
Fig. 1 shows the application of two force couples to a test specimen.

The first of these three fundamental conditions has not been obtained in existing bending apparatus except to a very approximate extent. In fact, theory and experience show that the best conditions of test by alternate folding are those in which the test piece is deformed by the application of two force couples, one in the opposite direction to the other, as shown in Fig. 1, in which the two moments of flexion M and M′ result from the application of forces at the points 1, 2, 3 and 4. In view of the fact that in these earlier apparatus the longitudinal movement of the guide jaws only took place on one side of the deformation, the latter could never be sufficiently symmetrical and uniform.

As regards the possibility of measuring the resistance of the metal during successive bendings, no device has been provided for this purpose and, even if such a device had been provided, the imperfection of the conditions of deformation (uncontrollable friction between the various parts of the apparatus and especially between the test piece and the guide jaws) would not enable useful conclusions of the tests to be drawn.

Finally, as regards the possibility of a precise adjustment of the conditions of the test, the older apparatus did not possess any efficient device. Further, the conception of these older apparatus was placed more on the realisation of the final conditions of each bending, whilst neglecting the precision of the intermediate phases.

The object of the present invention is to provide an apparatus adapted for testing all the principal mechanical qualities of metals by using for the purpose the method of alternating bendings.

As a base of deformations, the deformation of pure flexion has been selected, resulting from the application of two force couples as shown in Fig. 1. Under these conditions the deformation of a test piece (of which the rigidity of flexion is known) is defined completely by the diagram of the moments of flexion (diagram MF of Fig. 1, which refers to the medium fibre FM of the test piece). In fact, the absence of cutting forces in the zone of the principal deformations, the constancy of the moment of flexion in the whole of this zone, as also the plane sections (sections $m$—$n$) of the deformed zone cause the test piece to be deformed along an arc of a circle. The intensity of this deformation, as is well known, is expressed by the formula:

$$\frac{1}{R}=\frac{M}{EJ}$$

in other words, this deformation is proportional to the moment of flexion M and inversely proportional to the product EJ (the modulus of elasticity of the material divided by moment of inertia of the section) which expresses the rigidity of the section.

The tensions in the end fibres of the test piece (the extrados and intrados fibres) are expressed by the following formulae:

$$(\sigma\pm)_{max}=\frac{Mh}{2J}$$

and $$(\sigma\pm)_{min}=\frac{Mh}{2J}$$

When, with the intensity of bending, plastic deformations appear, these firstly affect the extreme fibres of the test piece. These plastic deformations increase rapidly in depth with the bending (see Fig. 1) so as finally to meet near the central fibre of the test piece whilst occupying practically the whole of the deformed zone of the test piece, as shown in Fig. 1, where DP indicate the plastic deformations.

The fact of applying symmetrically the actions of the two force couples sufficiently close to one another (the distance between the points 1 and 2, Fig. 1, which determines the zone of these deformations, is generally of the order of 2 or 3 times the thickness of the test piece) ensures a great homogeneity of the deformation. Under these conditions, the plastic deformations appear practically at the same time and in a sufficiently uniform manner over the entire length of the deformed zone. It thus follows that the weakening of the resistance of the test piece is produced homogeneously over the whole of this length and that the effect of the flexing moment also remains homogeneous. This new moment of flexion is expressed by the following formula:

$$M = \frac{E_r}{R} J$$

where $E_r$ represents the reduced modulus. When practically all the metal of the test zone has passed into the stage of plastic deformations, the reduced modulus $E_r$ becomes the modulus of plasticity—D and:

$$M_{plastic} = \frac{DJ}{R}$$

When the bending of a test piece is effected under these conditions, it is deformed according to a particular law which has formed the subject of a particular study.

Figure 3:
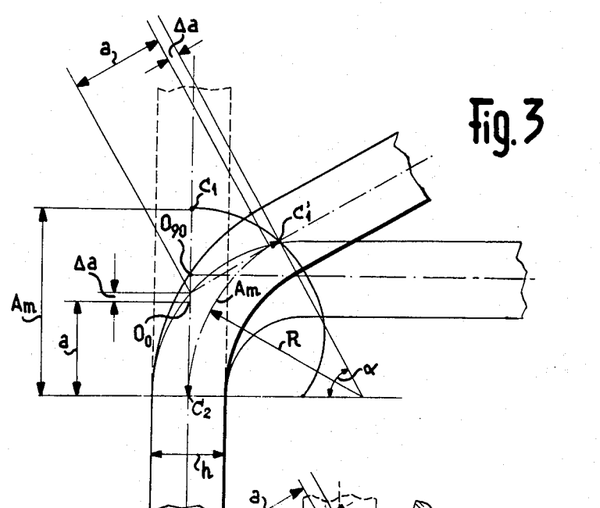
Fig. 3 shows a slight bending of a test specimen.

Fig. 3 shows the theoretical bending of such a test piece. The zone of the deformations—measured by the length of the mean fibre $A_m$—is constant. It may be adjusted in such a manner as to be equal to 2, 3, 4 and so forth times the thickness of the test piece. In principle:

$$A_m = a \times h \ (h = \text{the thickness of the test piece})$$

Therefore, by making a basis on the principle of plane sections, the absence of cutting forces in the zone of the principal deformations and consequently on the deformation following an arc of a circle, and assuming the point $C_2$ to be fixed, the point $C_1$, during bending, describes a curve, of which the analytic expression is:

$$2 \cos^2 \alpha + \cos \left( \frac{360}{\pi} \times \frac{A_m}{R} \times \cos \alpha \right) = 1$$

Figure 4:
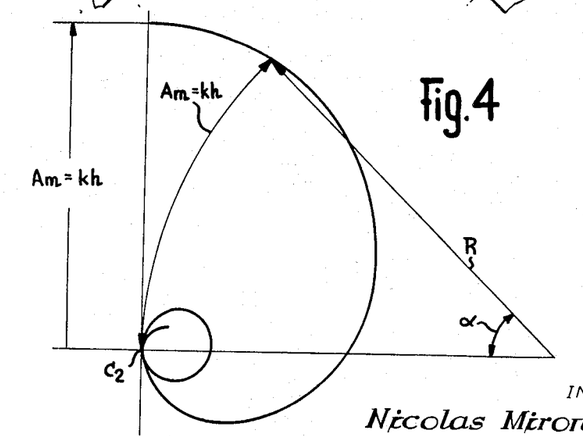
Fig. 4 shows the general appearance of the curve $Am=kh$.

Fig. 4 shows the general appearance of this curve.

From the diagram in Fig. 3, it is easy to follow that during the course of folding—when this takes place from 0° to 90°—the centre of symmetry of the deformation, the point 0, moves and progressively occupies the positions from $O_0$ to $O_{90}$ by following the line $C_2$—$C_1$.

It is also clear that the distance $a$ of this centre from the points $C_1$ and $C_2$ also increases and, for an angle of folding $\alpha$, acquires the value $a + \Delta a$.

Figure 2:
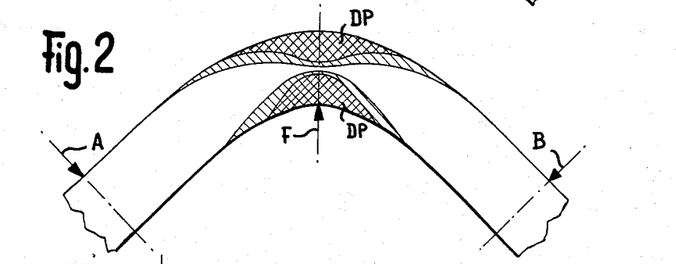
Fig. 2 shows the result of the application of two force couples plus a central force to a test specimen.

On the contrary, in the case when the deformation does not result from the symmetrical action of the two couples of forces, the appearance of the plastic deformations is produced quite differently. In fact, assuming that the deformation of the test piece is conditioned by the application of a force F (Fig. 2) on the test piece applied against the two points A and B. In this case the moment of flexion will reach its maximum value under the point of application of the force F, the curvature of the deformed test piece will have the shape of a parabola and, beyond the elastic limit, tends towards a hyperbola. The volume of metal engaged in the plastic deformations will, in this case, be totally indeterminable and further measurement is no longer possible.

Figure 5:
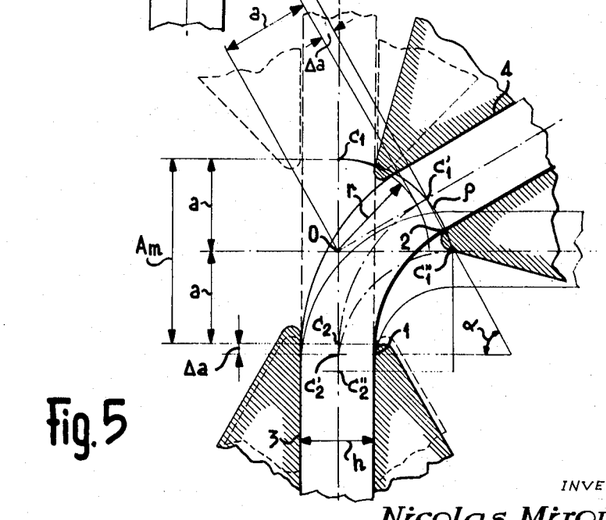
Fig. 5 shows the respective movements of the points $C_1$, $C_2$.

When, therefore, making a basis on a deformation resulting from the application of two force couples, for obtaining a simple construction of the apparatus whilst remaining close to the optimum conditions, it is more convenient to select the point 0 as the fixed pivotal point of the system. In this case, the respective movements of the points $C_1$ and $C_2$ will be effected along a line shown in Fig. 5. For a given angle $\alpha$, the point $C_1$ moves to $C'_1$ and the point $C_2$ to $C'_2$. The distances $a$ assume the values $a + \Delta a$.

Further, experience has also shown that, for reproducing the same conditions of deformation during the bending in the other direction (conditions particularly important in bending tests) it is necessary for the test piece to pass through an effective straightening, so that there do not remain any signs of the deformation due to the previous bending. In fact, this is extremely important as the tensioning of the metal produced by the plastic deformations may be the cause of an irregularity in the deformation and falsify the results of the tests.

Theory and experience show that, if all the conditions of deformation are respected, it becomes possible to effect the measurement of the resistance which the metal opposes during the course of the successive bendings.

This measurement may be made by means of a balance or other dynamometer connected to one of the two pairs of jaws.

However, during these conditions of bending, the measurement of the force generally meets two difficulties: friction in the various parts of the mechanism (friction in the hinge, in the sliding of the jaws, and so forth), and friction between the jaws and the test piece.

The apparatus according to the invention tends to permit of effecting tests of metals by alternative bendings whilst taking into consideration the conditions set out above.

This apparatus comprises, like known apparatus for testing metals by alternative bending, two pairs of converging jaws in which a test piece is adapted to be engaged, said jaws being capable of effecting an angular movement about a common hinge centre formed between two plates each supporting two jaws, one of said pairs of jaws forming guide jaws and the other pair of jaws clamping the test piece, the said guide jaws being movable to and fro in an opposite direction under the control of a balancing lever actuated by the angular movement of the jaws about the said common centre, a mechanism controlling the longitudinal sliding of the guide jaws, in proportion to the angular movement of the two plates, in such a manner as to modify the respective position of the two guide jaws, the end of one thereof forming a bearing point about which is effected the bending of the test piece, means being provided for modifying the distance between the two pairs of jaws in proportion to the thickness of the test piece for maintaining a determined relationship between the length of the deformed zone and the thickness of the test piece.

The apparatus according to the present invention is distinguished from known apparatus by the fact that it comprises a second pair of guiding jaws located on a plate carrying the clamping jaws, the guiding jaws of the second pair being adapted to operate symmetrically to those of the first pair, relatively to the said common centre, in such a manner as to maintain constant the length of the zone of deformation of the test piece and to ensure a symmetrical deformation of the latter.

Preferably, for eliminating friction in the various parts of the mechanism all the important hinges are mounted on ball or needle bearings and all the movements of translation are replaced by pivotal movements.

As regards friction between the ends of the jaws and the test piece, this is eliminated by the fact that the longitudinal movements of the guiding jaws, in these purely flexing conditions, are suited automatically to the movements (or sliding) of the extreme fibres of the test piece.

One form of construction of the apparatus according to the invention is shown by way of example in the accompanying drawings, wherein:

Figs. 16 ($a$, $b$, $c$, $d$, $e$ and $f$) show diagrammatically the various phases of bending a test piece.

As shown in Figs. 6 to 13, said apparatus comprises a supporting structure 10 to which is secured a hinge spindle 11, on which are hinged two plates 12 and 13, each supporting a pair of guiding jaws 14 and 15.

Figure 6:
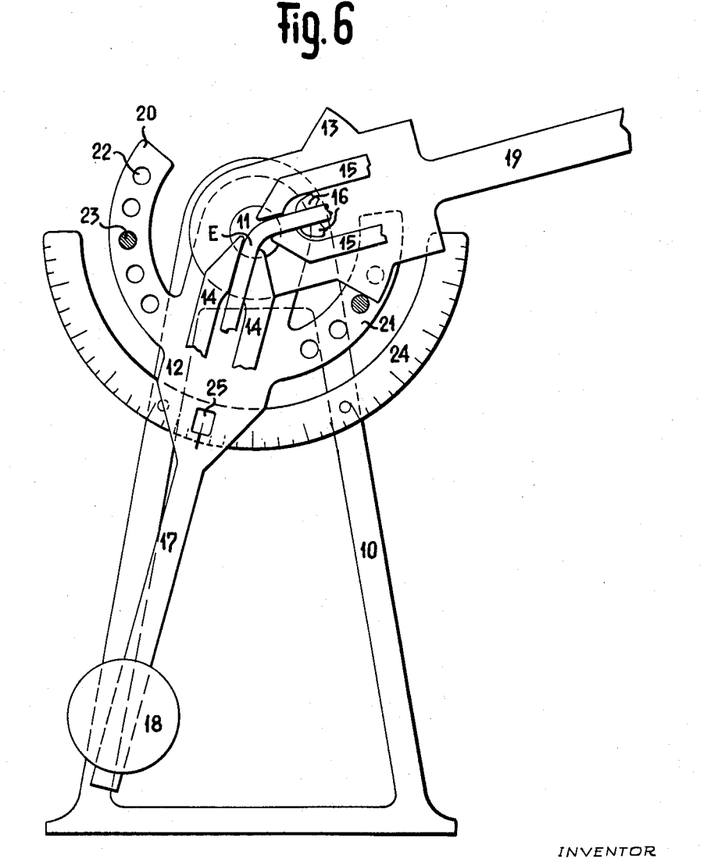
Fig. 6 is a complete view of the apparatus.

The plate 13 also carries a pair of clamping jaws 16, adapted to maintain the test piece E in engagement with the guide jaws. The plate 12 has an extension 17 to which is secured a weight 18, and the plate 13 has an extension 19 serving as an actuating handle for the apparatus. The plate 12 is also secured to two arcuate extensions 20 and 21, in which are drilled holes 22 determining different angles of bending. Stops 23 are capable of being engaged in said holes 22 for fixing the angle of bending to a given value.

Further, a graduated plate 24 is secured to the framework 10 and the plate 12 has an opening 25 through which it is possible to read the bending force on the graduated plate 24.

From the construction shown in Fig. 6, it will be seen that the two pairs of converging jaws 14 and 15 may carry out a relative angular movement about a common centre formed by the spindle 11, connecting together the two plates 12 and 13.

Figures 7, 8, 9:
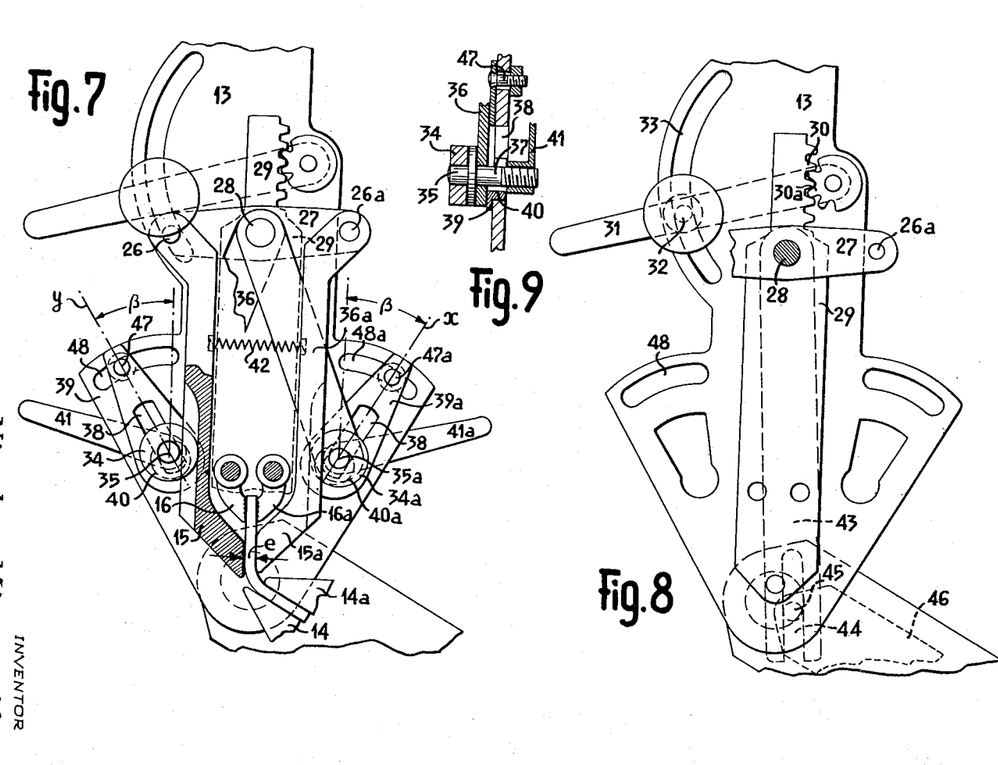
Figs. 7, 8 and 9 show some of the parts of the apparatus in greater detail.

Figs. 7, 8 and 9 show with greater precision the manner in which one of the pairs of guide jaws is formed. As seen in these figures, the two jaws 15 and 15a are capable of moving longitudinally, whilst pivoting on spindles 26 and 26a which are secured to a part 27 of T-shape, in turn pivoting on a spindle 28 secured to the part 29. The latter part 29 may be moved longitudinally on the plate 13 by means of a rack 30 and a toothed sector 30a secured to a lever 31. A locking screw 32, moving in an opening 33 provided in the plate 13 enables the exact position of the part 29 to be fixed relatively to the plate 13.

On the other hand the guiding jaws 15 and 15a bear against rollers 34 and 34a. Said rollers are adapted to adjust the spacing $e$ between the jaws, whilst eliminating friction during longitudinal movements of the jaws.

The rollers 34 and 34a are mounted on spindles 35 and 35a, which are secured to links 36 and 36a, which, in turn, are mounted hingedly on a spindle 23. On the other hand, extensions 37 of the spindles 35 and 35a are engaged in openings 38 of the parts 39. Lock nuts 41 and 41a enable the spindles of the rollers 34, 34a to be locked in position in the said openings 38. Said parts 39 and 39a can pivot about spindles 40 and 40a in such a manner as to impart different values to the angles $\beta$. They, viz. parts 39 and 39a, are secured in position on the plate 13 by locking screws 47 and 47a passing through arcuate openings 48 and 48a of the plate.

During longitudinal movement of the part 29, the jaws 15 and 15a move away from the pivotal centre 0 of the apparatus at the same time spacing apart under the action of the spring 42.

As shown in Fig. 7 of the drawing, the ratio between the spacing of the jaws from the centre 0 and their spacing apart is adjusted by the inclinations of the openings 38 (therefore by the value of the angle $\beta$). By thus modifying this ratio, the ratio between the length of the test zone of the test piece and its thickness is also modified.

Figure 14:
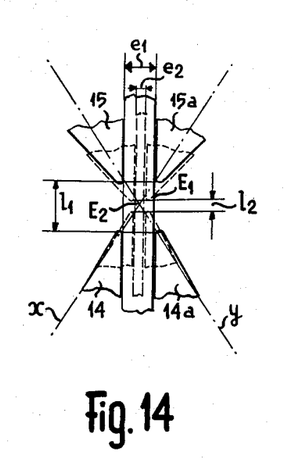
Figure 15:
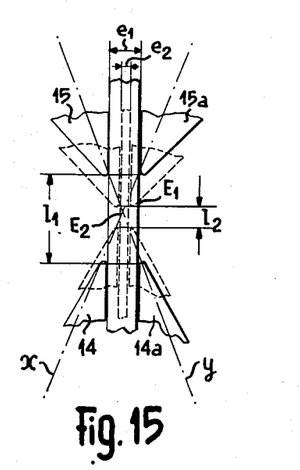

Figs. 14 and 15 show this modification of the ratio, which, once adjusted, remains valid for test pieces of all thicknesses.

As shown in Fig. 14, the test piece E, and the position in full lines of the guide jaws show that the ratio $l_1/e_1$ is the same as the ratio $l_2/e_2$ corresponding to a test made with a test piece $E_2$ of lesser thickness.

Fig. 15 shows the position of the guide jaws relatively to two similar test pieces $E_1$, $E_2$ after having selected a larger ratio $l/e$.

The lines $x$ and $y$ shown in Figs. 14 and 15 correspond with the direction which the openings 38 should have so that the bending takes place in a given ratio $l/e$ for test pieces of different thicknesses.

It will be seen from these Figs. 14 and 15 that, for effectively maintaining constant the ratio $l/e$ during the bending of test pieces of different thickness, it suffices to maintain the parts 39 and 39a locked in the same angular position for the various bending tests. It then suffices to loosen the lock nuts 41 for effecting adjustment of the position of the rollers 34 and 34a according to the thickness of the test pieces.

On the contrary, when a different ratio $l/e$ is selected, it is necessary to release the screws 47 and the nuts 41 for modifying the angular position of the parts 39 and 39a and to fix these according to the new ratio.

It is also to be observed that the clamping jaws 16 and 16a, which may be of any type, are also secured to the part 29.

As shown in Figs. 7 and 8, the longitudinal movements of the guide jaws are controlled by a slight balancing of the part 27 of T-shape. The central bar 43 of said part is provided at its end with a slide 44. The pivot 45, secured to the part 46, as a whole similar to the part 29 but appertaining to the plate 12, engages with the slide 44.

During bending operations the pivot 45 produces the rocking of the T-shaped part 27 and in this manner controls the longitudinal movement of the guide jaws hinged at 26—26a.

Figure 10:
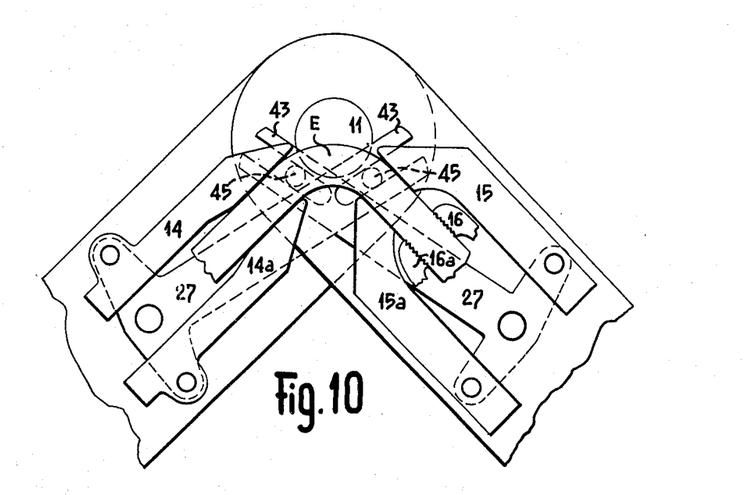
Fig. 10 shows to a larger scale, the two pairs of guiding jaws and the clamping device for the test piece.

The mechanism for controlling the guide jaws 14 and 14a is identical with that described with reference to Figs. 7, 8 and 9 for the guide jaws 15 and 15a and operates in a manner symmetrical thereto (see Fig. 10).

It results from this description that this double symmetrical mechanism provides for automatic adjustment of the value of the longitudinal movements of the two pairs of guide jaws and this in proportion:

a. to the amplitude of the angle of bending;
b. to the thickness of the test piece, and
c. to the length of the test zone of the test piece.

Figure 11:
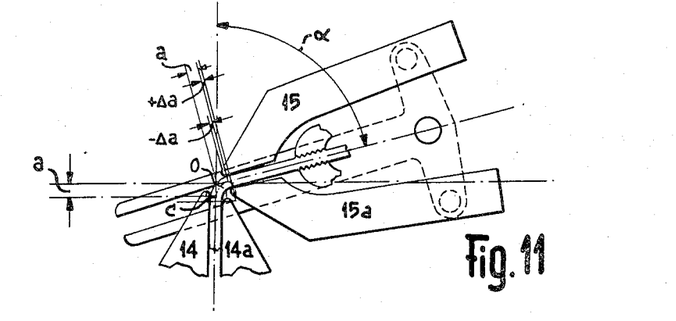
Figs. 11, 12, 13, 14 and 15 show explanatory diagrams of the operation of the apparatus.
Figure 12:
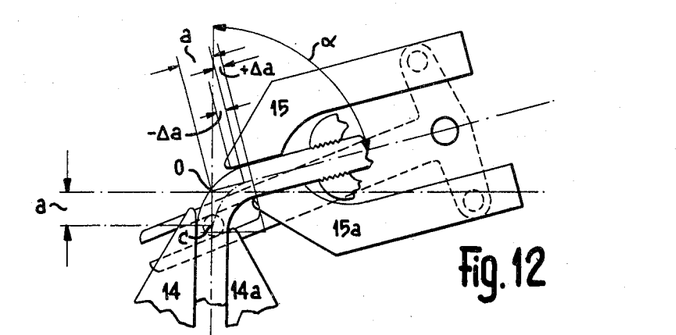
Figure 13:
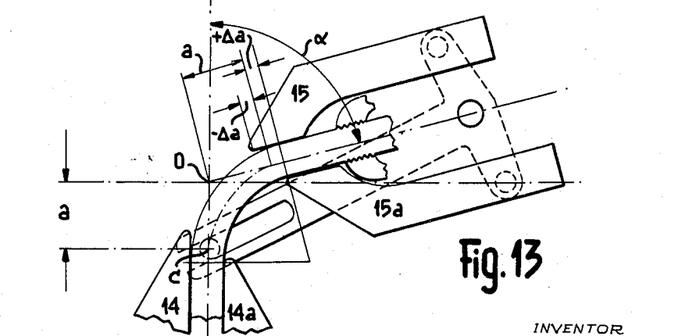

Figs. 11, 12 and 13 illustrate this automatic adjustment. In fact, if $a$ and $\Delta a$ respectively represent the distance of the guide jaws from the pivotal centre 0 and their longitudinal movements, in the case of a thin test piece (Fig. 11), all these values increase proportionately in the case of a thicker test piece (Fig. 12). They become still larger in the case of a test piece of the same thickness but of which the test zone has been increased in length (Fig. 13).

Fig. 16 ($a$, $b$, $c$, $d$, $e$, and $f$) shows diagrammatically the various stages of bending the test piece. Thus, Fig. 16a shows the starting portion. Figs. 16b and 16c show the bending in the direction of the arrows. Fig. 16d shows the straightening of the test piece in the course of bending in the reverse direction. Fig. 16e shows the complete straightening of the test piece and finally Fig. 16f shows the bending in the opposite direction.

The points marked 1, 2, 3 and 4 and 1', 2', 3' and 4' correspond with the points in Fig. 1. They indicate the points at which are applied the forces giving rise to the moments of flexion M, M'.

Figures 16A, 16B:
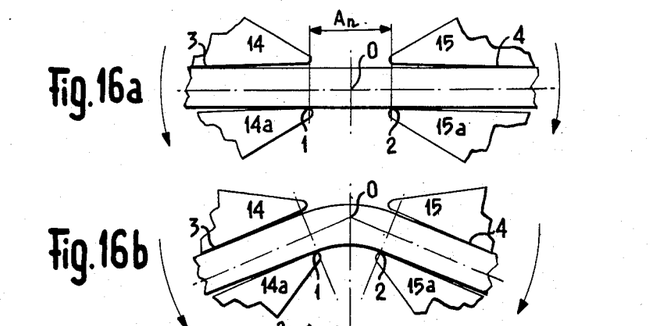
Figure 16C:
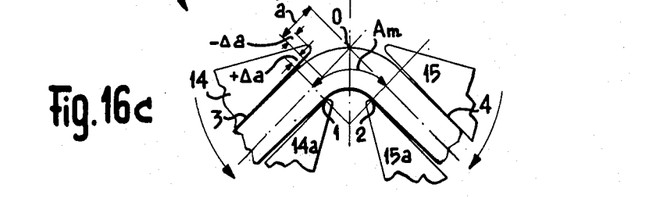
Figure 16D:
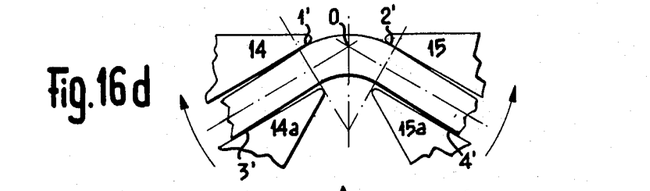
Figure 16E:
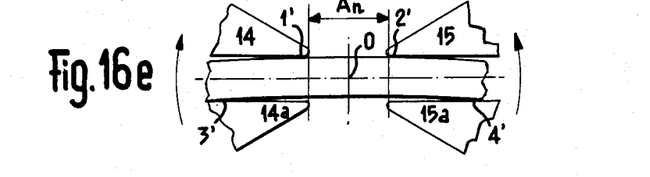
Figure 16F:
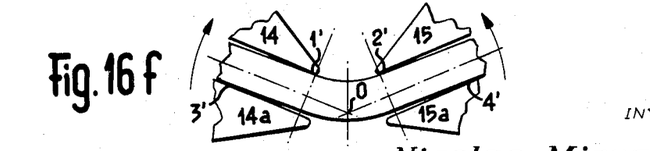

In Figs. 16a, 16b, 16c is shown the progressive return movement of the jaws 14a and 15a and the forward movement of the jaws 14 and 15.

The return of the jaws 14a and 15a is so controlled that the bearing points 1 and 2 determine the constant length of the test zone of the test piece, whilst ensuring constancy of the volume of metal which is being deformed and this symmetrically relatively to the pivotal centre of the apparatus, so that the deformations themselves are rigorously symmetrical, and their intensity is uniform over the entire length of the deformed zone.

Further, as a result, this longitudinal movement of the jaws is appropriate to the contraction of the intrados fibres of the test piece as also to the lengthening of its extrados fibres. In this manner the friction between the jaws and the test piece, which may result from the bending, is practically eliminated.

This enables the bending force to be measured, the bending force in this case corresponding to the resistance opposed by the metal. This measurement is effected by means of a pendulum secured to the plate 12 (Fig. 6). An automatic device for recording the force is also provided so as to permit of direct reading of the diagram of the forces applied. This recording device may be of any known type and consequently is not shown in the drawings.

I claim:

1. A universal testing apparatus for determining the mechanical properties of metals by the alternative bending of a test piece, comprising a supporting frame member, a calibrated scale member secured to said frame member, a hinge spindle member secured to said frame member, a first plate member and a second plate member mounted on said hinge spindle member for relative angular movement about said hinge spindle member, the plane of the longitudinal axis of said hinge spindle being perpendicular to the plane of the said plate members, means for angularly moving said first plate about said hinge spindle, said means being fixedly attached to said first plate, a weighted pendulum member attached to said second plate member, a pair of test piece clamping jaws on said first plate member, a first pair and a second pair of test piece guiding jaws, means for movably mounting each pair of guiding jaws on the first plate member and on the second plate member, respectively, said means including a means for controlling the longitudinal movement of the jaw members of each pair of guiding jaws with respect to the length of a test piece under deformation during the angular movement of the respective plate member and a means for moving the said jaw members of each pair of jaws to and fro during the angular movement of the respective plate members, and means for adjusting the spacing between the jaw members of each pair of guiding jaws in proportion to the test piece thickness, said means being operatively connected to the means for movably mounting each pair of test piece guiding jaws, whereby the length of the zone of deformation of the test piece is maintained constant and a symmetrical deformation of the test piece is attained.

2. A universal testing apparatus for determining the mechanical properties of metals by the alternative bending of a test piece, comprising a supporting frame member, a calibrated scale member secured to said frame member, a hinge spindle member secured to said frame member, a first plate member and a second plate member mounted on said hinge spindle member for relative angular movement about said hinge spindle member, the plane of the longitudinal axis of said hinge spindle being perpendicular to the plane of said plate members, means for angularly moving said first plate about said hinge spindle, said means being fixedly attached to said first plate, a weighted pendulum member attached to said second plate member, each of said plate members having mounted thereon a pinion member and a longitudinal member having a rack at one end thereof engaging said pinion member and a pivot member at the other end thereof, a pair of test piece clamping jaws attached to said longitudinal member on said first plate member in the vicinity of said pivot member thereon, a spindle member on each of said longitudinal members in the vicinity of the rack thereon, a T-shaped lever mounted on each of said longitudinal members having a transverse ber movably mounted at its central portion on said spindle member and a longitudinal bar movably mounted at one end thereof about said spindle member, each of said longitudinal bars having a notched slide portion at its other end for engagement with the said pivot member on the longitudinal member on the other plate member, a first pair and a second pair of guiding jaws movably attached to each of said transverse bars of each of said T-shaped lever members, respectively, each jaw member being movably attached at its rear end portion to the end of the respective transverse bar, whereby said jaw members of each pair of guiding jaws may move to and fro during the angular movement of the respective plate members, and means for adjusting the spacing between the jaw members of each pair of guiding jaws in proportion to the test piece thickness and for eliminating friction between said jaw members and the test piece during the longitudinal movement of said jaw members, said means including roller members operatively connected to said transverse bar and to the respective plate member, whereby the length of the zone of the deformation is maintained constant and a symmetrical deformation of the test piece is attained.

References Cited in the file of this patent

UNITED STATES PATENTS

| | | |
|---|---|---|
| 1,951,908 | Hayford | Mar. 20, 1934 |
| 2,462,826 | Waard | Feb. 22, 1949 |

FOREIGN PATENTS

| | | |
|---|---|---|
| 498,158 | Belgium | Oct. 14, 1950 |
| 503,734 | Belgium | July 30, 1951 |